United States Patent [19]
Buff, IV

[11] Patent Number: 5,503,062
[45] Date of Patent: Apr. 2, 1996

[54] WIRE SUPPORT AND INNER RACK FOR THIN ALUMINUM ROASTING PAN

[75] Inventor: George J. Buff, IV, Cherry Hill, N.J.

[73] Assignee: Penny Plate, Inc., Cherry Hill, N.J.

[21] Appl. No.: 177,609

[22] Filed: Jan. 5, 1994

[51] Int. Cl.⁶ .............................. A47J 37/04; A47J 43/00; A47J 43/18
[52] U.S. Cl. .............................. 99/426; 99/449; 220/743; 220/756; 220/912; 220/647; 211/181
[58] Field of Search ..................... 220/491, 485, 220/743, 756, 912; 99/425, 426, 449; 211/181; 126/25 R, 29

[56] References Cited

U.S. PATENT DOCUMENTS

| | | | |
|---|---|---|---|
| Re. 33,397 | 10/1990 | Anders | 220/94 R |
| D. 260,227 | 8/1981 | Bentson | D7/129 |
| 749,199 | 1/1904 | Jones | 220/647 |
| 3,063,360 | 11/1962 | Fitch et al. | 99/426 |
| 3,194,429 | 7/1965 | Bouet | 220/85 H |
| 3,359,889 | 12/1967 | Young et al. | 99/426 |
| 3,407,802 | 10/1968 | Warner | 126/25 R |
| 3,422,959 | 1/1969 | Sharaf | 211/181 |
| 3,536,000 | 10/1970 | Whitehill | 99/425 |
| 3,566,776 | 3/1971 | Young et al. | 99/426 |
| 4,186,217 | 1/1980 | Tchack | 220/491 |
| 4,200,040 | 4/1980 | MacRae | 99/426 |
| 4,817,812 | 4/1989 | Sarnoff et al. | 220/85 |
| 4,848,217 | 7/1989 | Koziol | 99/426 |
| 4,852,760 | 8/1989 | Sarnoff et al. | 220/85 H |
| 4,930,642 | 6/1990 | Brooks et al. | 211/181 |
| 4,969,569 | 11/1990 | Anders | 220/69 |
| 4,971,216 | 11/1990 | Fortune | 220/94 R |
| 5,029,721 | 7/1991 | Timpe | 220/94 R |
| 5,065,734 | 11/1991 | Elliott | 126/25 R |
| 5,203,254 | 4/1993 | Fletcher | 99/426 |
| 5,339,728 | 8/1994 | Marchwiak et al. | 99/426 |

FOREIGN PATENT DOCUMENTS

| | | | |
|---|---|---|---|
| 448507 | 5/1948 | Canada | 220/491 |
| 1200498 | 7/1978 | United Kingdom | 220/491 |

*Primary Examiner*—David Scherbel
*Assistant Examiner*—Tony G. Soohoo
*Attorney, Agent, or Firm*—Panitch Schwarze Jacobs & Nadel

[57] ABSTRACT

The invention is a reinforcing support structure for a pan adapted to contain an object. The pan has a pan bottom and a sidewall extending upwardly from the periphery of the pan bottom. An outwardly extending rim is formed on the upwardly extending sidewall around the entire circumference of the pan. An outer support for holding the pan has an upper support portion and a lower support portion. The upper support portion is applied to the entire outwardly extending rim of the pan to support and reinforce the extending rim. The lower support portion also includes a plurality of horizontal support members wherein at least one of the horizontal support members is formed in a zigzag shape. An object support rack is disposed within the pan to support the object when the object is disposed in the pan. The object support rack includes a spacer for spacing the object apart from the pan bottom. Both the outer support and the object support rack are provided with handles for lifting and carrying the reinforcing support structure. The handles of the object support rack and the handles of the outer support are adapted to mate with each other.

13 Claims, 2 Drawing Sheets

WIRE SUPPORT AND INNER RACK FOR THIN ALUMINUM ROASTING PAN

BACKGROUND OF THE INVENTION

Aluminum foil pans are widely used for the purposes of roasting and oven baking of large food items such as turkeys, hams, roasts and the like. Their wide use for these purposes is at least partly due to the fact that they are efficient in quickly distributing heat to the food item. Additionally, because aluminum foil roasting pans are inexpensive it is economically feasible to dispose of them after they are used. This permits users to avoid the inconvenience of cleaning soiled pans. A wide variety of shapes and sizes of disposable aluminum roasting pans of this type have been developed for use with the various types of food items when they are baked in ovens.

However, significant buckling and twisting problems are encountered when using many prior art disposable aluminum foil pans to bake heavy food items because the weight of these food items was often too heavy to be supported by the pan. These problems were particularly serious when the baking process has ended and the user of the roasting pan attempted to remove the pan from the oven while it was very hot. If there were liquids in the pan, such as cooking juices, gravy and the like when it was transported, the user was often required to take great care to prevent spillage and burns. Two people were often required so that they could grasp opposite ends of the disposable aluminum foil pan in order to hold it level while transporting it from the oven in order to prevent buckling and twisting of the pan. Buckling and twisting of disposable aluminum foil pans may cause the spilling of very hot cooking juices over the sidewalls of the roasting pans as well as indentations in the body of the pans. These indentations can lead to leaks of the juices.

Buckling and twisting of disposable aluminum foil pans was most likely to occur when they were formed of very thin aluminum sheet material. For example, disposable aluminum foil pans used for baking or broiling poultry may be formed of stamped aluminum sheet material with a thickness of 0.0065 inch or less. This thickness may make an aluminum foil pan suitable for supporting no more than twenty pounds without buckling and twisting problems.

Sometimes these prior art aluminum foil roasting pans were lifted from underneath using insulated gloves in order to prevent these problems. However, conventionally available gloves were sometimes not adequate to protect users of the roasting pans from getting burned under these circumstances because of the high temperature of the materials within the pans.

Additionally, when using these aluminum foil roasting pans it was a common practice to position the turkey, roast or other food item on the bottom of the roasting pan. This caused the turkey or roast to stick to the bottom of the roasting pan and to become partially submerged in their cooking juices during the cooking process. The cooking of food items while they are partially submerged in their juices in this manner is believed by some users to be unhealthy and to cause a displeasing quality.

Another problem associated with prior art disposable aluminum foil roasting pans was that they were not well adapted for serving the food item after roasting. Additionally, food items stored in these roasting pans tended to cool rather quickly after they were removed from the oven.

Thus, prior art disposable aluminum foil roasting pans buckled when heavy food items were transported, allowed the food items to cook partially submerged in their own juices, were not satisfactory for serving the food items baked therein, and allowed the food items to quickly cool after removal from the oven. Several attempts to solve these and other related problems have been made in the prior art.

For example, stamped crease lines have been provided in the bottom surface of some prior art aluminum foil roasting pans. These crease lines were effective to provide some reinforcement of the bottoms of the pans and to help prevent the buckling and twisting problems. These stamped crease lines have also been advantageously provided in the side walls of prior art disposable roasting pans in order to provide further reinforcement of the pans. However, the reinforcement provided by providing these crease lines in prior art roasting pans was often a limited improvement.

Additionally, it is known to provide disposable aluminum foil roasting pans with an upper curled-over lip around the upper edge of the pan sidewalls. These curled-over lips added a degree of rigidity and strength to the pan thereby further helping to avoid the buckling and twisting problems. However, due to the relatively small gauges commonly used for these roasting pans, and their generally flimsy nature, this kind of reinforcement often failed to prevent the pan from buckling or twisting as the user carried a filled pan to or from the oven.

A variety of outer support and internal support rack assemblies are known in the prior art for solving some of the problems encountered in the use of disposable aluminum foil pans. These prior art assemblies are typically designed to support the aluminum foil pan on an underlying support frame in some manner. For example, Anders, U.S. Pat. No. 4,717,038, taught an assembly for providing reinforcement of the underside of a disposable roasting pan. The reinforcing assembly taught by Anders thus allowed the use of thin aluminum sheet material to form the pans while providing a great deal more stability than prior art disposable pans.

Additionally, the reinforcing assembly of Anders was provided with handles to assist in carrying heavy food items. Although the reinforced disposable pan of Anders helped to prevent the problem of buckling due to the weight of heavy food items, it still permitted the food item to become partially submerged in its own cooking juices. Furthermore, this assembly was not suitable for serving the food items or keeping the food items warm after they were cooked in the disposable roasting pan.

Another disposable aluminum foil roasting pan known in the prior art provided stability comparable to that of the roasting pan disclosed in Anders while also providing legs to raise the pan to a convenient serving level. Raising the roasting pan in this manner permitted the roasting pan to be used conveniently as a serving pan. In addition to permitting more convenient serving another advantage of raising the roasting pan to this level was that it permitted placement of chemical or electric warming devices beneath the aluminum serving pan. Using this reinforcing and serving assembly food items could be served from the disposable pan and could be kept warm for extended periods of time. Because the stamped aluminum forming the disposable serving pan was substantially thinner than the steel usually used in other types of heated serving arrangements, food items could be kept warm with less energy.

Numerous other holders and racks have been used for conventional cooking receptacles. They are, however, not directed toward use with disposable type metal foil pans. Other holding frames require cooperative engagement between the frame and a boiler or roaster of a very rigid and thick design.

The present invention relates to improvements to an outer support and an internal support rack for a thin aluminum roasting pan for holding a heavy food item while the food item is cooked. The outer support of the present invention includes an upper support wire and lower support wires. The upper support wire of the outer support extends beneath the entire upper rim of the roasting pan and thereby provides support for the upper rim. The lower support wires of the outer support provide longitudinal and transverse support to the bottom surface of the roasting pan. The height of the upper support wire may be selected to cause the bottom of the roasting pan to be spaced apart from the lower support wires. Both the outer support and the internal support rack are provided with handles. The handles of the internal support rack rest near the handles of the outer support thereby permitting them to be grasped simultaneously. The handles provided on the internal support rack permit the internal support rack to be used alone to transport the food item to a cutting surface or other destination. The internal support rack is provided with zigzag cross supports which help prevent the food item from coming in contact with the bottom of the pan. In addition, the legs of the internal support rack hold the food item away from the bottom of the pan so that the food item does not stick to the bottom of the pan and does not cook in its own grease. The outer support and the internal support rack may be reused.

SUMMARY OF THE INVENTION

Briefly stated, the invention is a reinforcing support structure for a pan adapted to contain an object. The pan has a pan bottom and a sidewall extending upwardly from the periphery of the pan bottom. A rim extends from the upwardly extending sidewall. The reinforcing support structure of the present invention has an outer support for holding the pan wherein the outer support has an upper support portion and a lower support portion. The upper support portion is adapted to be applied to the extending rim of the pan in order to support and reinforce the extending rim. The lower support portion of the outer support has a pan bottom support region for supporting the pan bottom and the object when the object is disposed within the pan.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENTS

Figure 1:
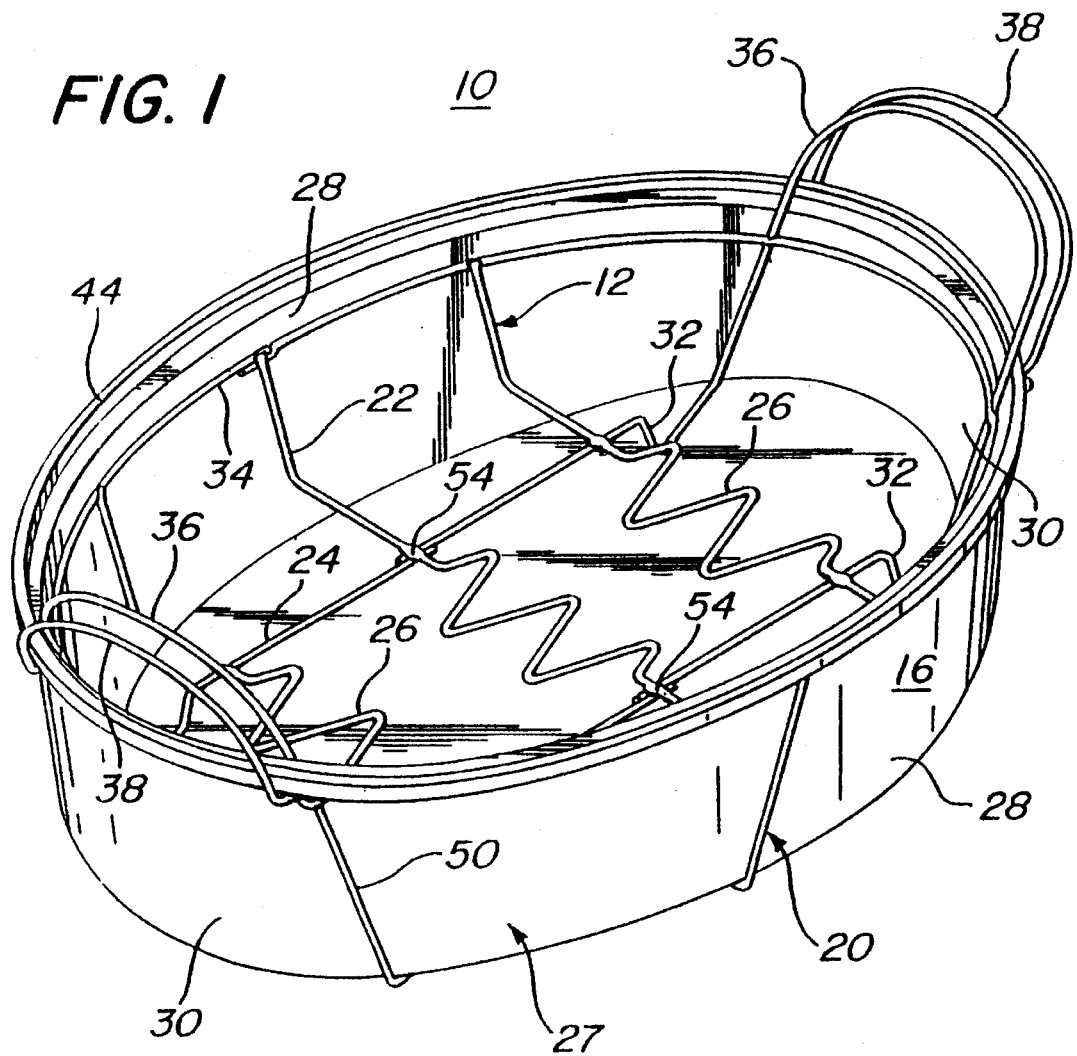
FIG. 1 is an isometric view of the roasting pan reinforcing assembly of the present invention.
Figure 2:
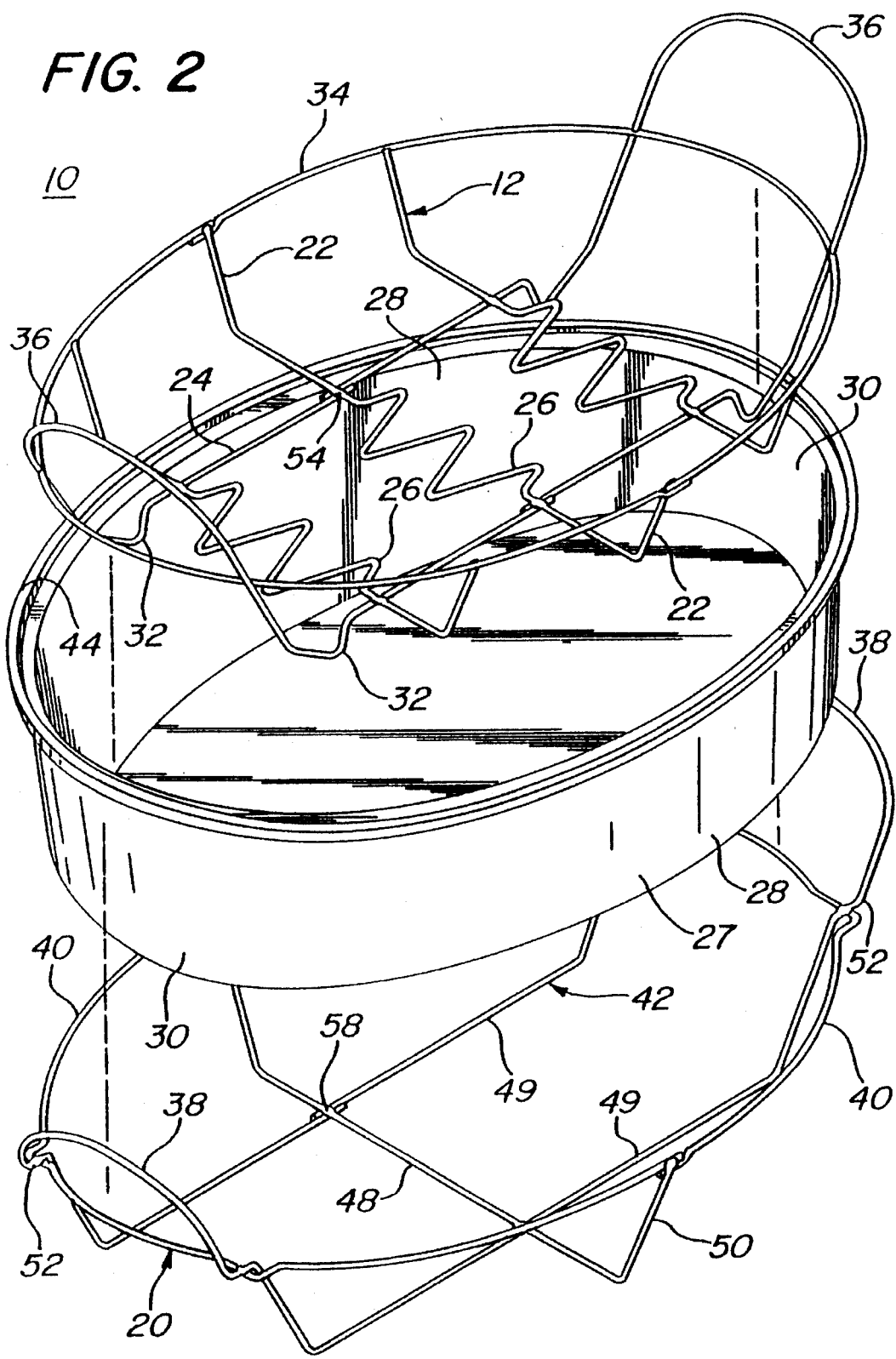
FIG. 2 is an exploded isometric view of the roasting pan reinforcing assembly of FIG. 1.

Referring to FIGS. 1, 2, wherein the same numerals are used to indicate like elements throughout, there is shown an isometric view and an exploded isometric view of the roasting pan reinforcing assembly 10 of the present invention for use with a disposable aluminum foil roasting pan 16. The roasting pan reinforcing assembly 10 is a pan reinforcing support structure including an internal support rack 12 which is adapted to be disposed within the disposable roasting pan 16 to support a relatively heavy food item (not shown) disposed thereupon. Also included in the roasting pan reinforcing assembly 10 is an outer support frame 20 for containing the disposable aluminum foil roasting pan 16 and the food item.

Relatively heavy food items such as turkeys, hams, roasts and the like may be roasted as well as transported before and after roasting using the roasting pan reinforcing assembly 10 without excessive buckling and twisting of the aluminum foil roasting pan 16. While containing such a heavy food item the reinforcing assembly 10 may be grasped and lifted by a single user without excessive danger of spillage or leakage of hot liquids. Additionally, a heavy food item may be easily removed from the interior of the disposable roasting pan 16 when roasting is complete using the internal support rack 12 of the reinforcing assembly 10.

The disposable roasting pan 16 of the reinforcing assembly 10 has a pan bottom 46 and a surrounding sidewall 27 extending upwardly around the entire periphery of the pan bottom 46. The upwardly extending surrounding sidewall 27 may extend at a slight outward angle away from the center of the roasting pan 16 in the preferred embodiment of the roasting pan 16. Surrounding sidewall 27 of the roasting pan 16 comprises two opposing parallel walls 28 along its longitudinal direction and two opposing arcuate walls 30 at opposite ends thereof.

In the preferred embodiment of the disposable roasting pan 16 the upper edges of the opposing parallel walls 28, as well as the upper edges of the opposing arcuate walls 30, are provided with an outwardly extending peripheral rim 44. The rim 44 is of the type which may be formed by folding and repeatedly curling the upper edge of the surrounding sidewall 27 to form a bead and a region of the rim 44 between the bead and the periphery of the sidewall 27 which is substantially horizontal. The fold and bead of the outwardly extending rim 44, or reinforcing rim 44, are effective to reinforce the disposable roasting pan 16. It will be understood that the reinforcing rim 44 preferably extends around the entire upper periphery of the surrounding sidewall 27 of roasting pan 16.

The outer support frame 20 of the roasting pan reinforcing assembly 10 includes an upper support wire 40, or upper support portion 40, which surrounds the sidewall 27 of the roasting pan 16. When the disposable roasting pan 16 is contained within the outer support frame 20 the upper support wire 40 is applied to the substantially horizontal region of the outwardly extending rim 44. The outwardly extending rim 44 of the roasting pan 16 rests upon and is supported by the upper support wire 40 of the support frame 20. In the preferred embodiment of the outer support frame 20 the entire length of the pan support rim 44 around the entire upper periphery of the surrounding sidewall 27 rests upon the upper support wire 40 and is supported by the upper support wire 40.

The outer support frame 20 also includes a lower support wire 42, or lower support portion 42. The lower support wire 42 of the outer support frame 20 includes horizontal longitudinal members 49 and at least one horizontal transverse member 48. The horizontal members 48, 49 of the outer support frame 20 intersect at the intersection points 58 and are attached to each other at the intersection points 58 in the preferred embodiment of the reinforcing assembly 10.

The outer support frame 20 also includes several upstanding frame support members 50. The upstanding frame support members 50 of the outer support frame 20 are bracingly coupled between the upper support wire 40 and the lower support wire 42. Thus the upper support wire 40 is supported above a resting surface (not shown) by the upstanding support members 50 when the outer support frame 20 is disposed upon such a resting surface.

In the preferred embodiment of the outer support frame 20 the length of the upstanding support members 50 is selected to maintain the pan bottom 46 in a spaced apart relationship with the horizontal members 48, 49 when the extending pan support rim 44 rests upon the upper support wire 40. This is assured by selecting upstanding support members 50 which are longer than the height of the surrounding sidewall 27 of the roasting pan 16. The upstanding frame members 50 may extend outwardly as well as upwardly from the bottom to the top of the outer support frame 20 in order to facilitate nesting of a disposable aluminum foil roasting pan 16 therein.

The outer support frame 20 of the roasting pan reinforcing assembly 10 is also provided with a pair of generally U-shaped outer support handles 38 at opposite ends thereof. The outer support handles 38 are coupled to the upstanding frame support members 50 in the preferred embodiment of the outer support frame 20. The outer support handles 38 are adapted to be grasped in order to lift and carry the outer support frame 20 and the aluminum foil roasting pan 16 when the roasting pan 16 is contained within the outer support frame 20.

Additionally, shoulders 52 are provided in the region of the outer support frame 20 where the generally U-shaped outer support handles 38 are coupled to the upstanding frame support members 50. The shoulders 52 nestably receive the outwardly extending support rim 44 of the roasting pan 16, thereby providing further support and reinforcement to the outwardly extending support rim 44.

The upper region of the internal support rack 12 of the reinforcing pan assembly 10 includes a rack upper support wire 34 which is coupled to and supported by a plurality of rack upstanding members 22. In addition to supporting and bracing the rack upper support wire 34, the rack upstanding members 22 help center a food item or other object disposed within the roasting pan 16. The lower region of the internal support rack 12 includes horizontal longitudinal rack wires 24 horizontal transverse rack wires 26 as well as rack spacers 32. The internal support rack 12 also includes two U-shaped internal rack handles 36 at opposite ends thereof for grasping and lifting the support rack 12.

The longitudinal rack wires 24 and the transverse rack wires 26 of the internal rack 12 intersect at the points 54 and are attached to each other at the intersection points 54. In this manner the horizontal rack wires 24, 26 form an object support region for supporting an object such as a heavy food item disposed upon the internal support rack 12. The overall dimensions of the internal support rack 12, and the length and separation of the longitudinal wires 24 and the transverse wires 26 in particular, are selected to cause this object support region of the internal support rack 12 to cover most of the pan bottom 46.

The internal support rack 12 of the roasting pan reinforcing assembly 10 is provided with spacers 32 in order to space the object support region formed by rack wires 24, 26 apart from the pan bottom 46. Thus when a heavy food item is disposed upon the internal support rack 12 within the roasting pan 16, it is prevented from coming in contact with pan bottom 46. This prevents sticking of the food item to the pan bottom 46 during cooking. It also prevents the food item from being immersed in its juices while it is cooking within the roasting pan 16. Additionally, it is believed that the spaces 32 facilitate faster cooking of the food item because they permit circulation of heat around all sides of the food item.

The rack transverse wires 26 are formed in a zigzag configuration in the preferred embodiment of the internal support rack 12. The zigzag configuration of the rack transverse wires 26 provides more rack surface area for better supporting a food item disposed thereupon. Forming rack transverse wires in a zigzag configuration also helps to prevent a food item disposed thereupon from falling between the horizontal rack wires 24, 26 during cooking and transporting of the food item.

The generally U-shaped internal rack handles 36 of the internal support rack 12 are coupled to the rack upper support wire 34 in the preferred embodiment. When the internal rack handles 36 only are grasped, the internal support rack 12 may be lifted separately from the roasting pan 16 and the outer support frame 20. In this manner a food item disposed thereupon may be removed from the roasting pan 16 after cooking and transported.

Each rack handle 36 of the internal support rack 12 dwells substantially close to a corresponding outer support handle 38 of the outer support frame 20 when the internal rack 12 is disposed within the outer support frame 20. This is best seen in FIG. 1 wherein a substantially parallel mating relationship is shown between a rack handle 36 and a corresponding outer support handle 38 at each end of the pan reinforcing assembly 10 at the extremes of the longitudinal dimension of assembly 11. When a rack handle 36 and its corresponding outer support handle 38 are thus matingly positioned, they may be conveniently grasped with a single hand. The upwardly extending mating handles 36, 38 may be angled slightly away from the center of the reinforcing assembly 10 while being maintained closely adjoined and parallel to each other in order to facilitate grasping them in this manner.

When the respective mating handles 36, 38 at each end of the reinforcing assembly 10 are simultaneously grasped in this manner, the reinforcing assembly 10 may be safely lifted by a single user while a relatively heavy food object is disposed therein. The roasting pan reinforcing assembly 10 thereby supports the heavy food item and prevents buckling and twisting of the disposable aluminum foil roasting pan 16 while the heavy food item is being transported.

As previously described, an internal support rack 12 is provided within the preferred embodiment of the roasting pan reinforcing assembly 10 of the present invention. However, it will be understood that a user may wish to use the pan reinforcing assembly 10 without an internal support rack 12. In this embodiment of the reinforcing assembly 10 the roasting pan 16 is disposed within the outer support 20 and the food item is disposed directly upon the pan bottom 16.

When a food item or other object is disposed within the roasting pan 16 in this manner the pan bottom 46 is forced to bend downwardly under the weight of the object. This may cause the pan bottom 46 to bend and be pressed against the horizontal support members 48, 49 of the outer support frame 20. The horizontal members 48, 49 thus may form a pan bottom supporting region 42 in this configuration of the reinforcing assembly 10. The horizontal support members 48, 49 of the pan bottom supporting region 42 may therefore be effective to assist in supporting the pan bottom 46 and the food item disposed within the roasting pan 16 in this configuration of the reinforcing assembly 10.

The outer support frame 20 and the internal support rack 12 may be formed of nickel coated wires in the preferred embodiment of the roasting pan reinforcing assembly 10. Both the outer support frame 20 and the internal support rack 12 are adapted to be reusable after a food item has been roasted in the reinforcing assembly 10 and the soiled roasting pan 16 has been discarded. The nickel coated wires forming the outer support frame 20 and the internal support rack 12 may be formed of forged steel which may be notched and stamped in a manner understood by those skilled in the art.

The advantages of using a forging process rather than a spot weld process to form the outer support frame 20 and the internal support rack 12 include the fact that the forging process eliminates the need for using lead to the form the reinforcing assembly 10. Moreover, spot welds tend to crack during the application of heat, especially during the process of manufacturing the roasting pan reinforcing assembly 10. The foil forming the disposable roasting pan 16 may be a thin piece of any suitable material although aluminum foil is used in the preferred embodiment. In the preferred embodiment the disposable roasting pan 16 is formed of a unitary sheet of stamped aluminum having a thickness between 0.003" and 0.008".

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A reinforcing support structure for a disposable pan adapted to contain an object, said pan having a pan bottom, a sidewall extending upwardly from the periphery of said pan bottom, and a rim extending from said upwardly extending sidewall, said rim has a rim length extending around the entire periphery of said sidewall, comprising:

an outer support for holding said pan therein, said outer support having a lower support portion and an upper support portion;

said lower portion having upstanding members coupled to said upper support portion for supporting said upper support portion;

said upper support portion being adapted to be applied to said extending rim around the entire rim length and to support and reinforce said extending rim;

an internal support rack disposed within said self-supporting pan and adapted for supporting said object thereupon when said object is disposed within said pan;

opposing outer support handles coupled to said outer support for grasping and lifting said outer support; and opposing support rack handles coupled to said internal support rack.

2. The pan reinforcing support structure of claim 1, wherein said lower support portion includes a horizontal support region and said upper support portion maintains said pan bottom in a spaced apart relationship with said horizontal support region.

3. The pan reinforcing support structure of claim 1, wherein said internal support rack comprises a spacer for spacing said object apart from said pan bottom when said object is disposed upon said internal support rack within said pan.

4. The pan reinforcing support structure of claim 1, wherein said support rack handles are positioned substantially close to said outer support handles when said internal support rack is disposed within said pan and said outer support.

5. The pan reinforcing support structure of claim 1, wherein said outer support comprises a wire support frame.

6. A combination object support assembly for a pan adapted to contain said object, said pan having a pan bottom, a sidewall extending upwardly from the periphery of said pan bottom, and a rim extending from said upwardly extending sidewall, comprising:

a support frame for receiving and holding said pan;

an object support rack for being disposed within said pan and supporting said object when said object is disposed within said pan;

opposing support frame handles coupled to said support frame for grasping said support frame handle and transporting said support frame;

opposing object support rack handles coupled to said object support rack for grasping and transporting said object support rack; and each of said support frame handles being positioned substantially close to a respective object support rack handle when said object support rack is disposed within said pan to permit said support frame handles and said object support handles to be grasped simultaneously.

7. The combination object support assembly of claim 6, wherein said handles are generally U-shaped handles extending from said object support assembly substantially parallel to each other.

8. The combination object support assembly of claim 7, wherein at least one of said horizontal members is formed in a zigzag configuration.

9. The combination object support assembly of claim 6, wherein said object support assembly has a longitudinal dimension with opposing assembly ends at the opposite extremes thereof further comprising a mating support frame handle and object support rack handle at each extreme.

10. The combination object support assembly of claim 6, wherein said support frame comprises:

a first support portion adapted to be applied to said extending rim and to support and reinforce said extending rim; and a second support portion adapted to support said first support portion above a resting surface when said support frame is disposed upon said resting surface.

11. The combination object support assembly of claim 10, wherein said pan bottom is spaced apart from said resting surface by said first support portion.

12. The combination object support assembly of claim 6, wherein said object support rack includes a longitudinal horizontal member and a transverse horizontal member.

13. The combination object support assembly of claim 6, wherein said object support rack comprises a spacer for spacing said object apart from said pan bottom when said object is disposed upon said object support rack.

\* \* \* \* \*